United States Patent [19]

Nishio et al.

[11] Patent Number: 4,931,238
[45] Date of Patent: Jun. 5, 1990

[54] METHOD FOR MANUFACTURING A SINTERED BODY WITH HIGH DENSITY

[75] Inventors: Hiroaki Nishio; Takeshi Kawashima, both of Tokyo, Japan

[73] Assignee: Nippon Kokan Kabushiki Kaisha, Tokyo, Japan

[21] Appl. No.: 203,239

[22] Filed: Jun. 6, 1988

[30] Foreign Application Priority Data

Jun. 12, 1987 [JP] Japan .................................. 62-145323

[51] Int. Cl.$^5$ .............................................. C04B 35/64
[52] U.S. Cl. ........................................ 264/62; 264/63; 264/344; 419/40; 419/49
[58] Field of Search ............................ 264/63, 62, 344; 419/40, 49

[56] References Cited

U.S. PATENT DOCUMENTS

| | | |
|---|---|---|
| 4,112,143 | 9/1978 | Adlerborn et al. |
| 4,622,186 | 11/1986 | Mizutani ............................. 264/62 |
| 4,643,858 | 2/1987 | Mizutani ............................. 264/62 |
| 4,737,332 | 4/1988 | Miyashita et al. ................. 264/344 |
| 4,820,462 | 4/1989 | Nakajima et al. .................. 264/63 |

FOREIGN PATENT DOCUMENTS 3403917 11/1985 Fed. Rep. of Germany .
35870 8/1984 Japan .
261274 11/1986 Japan .

Primary Examiner—James Derrington
Attorney, Agent, or Firm—Frishauf, Holtz, Goodman & Woodward

[57] ABSTRACT

Method for manufacturing a sintered body with high density comprises: turning first powder into a first slurry by dispersing the first powder in a first dispersion medium composed mainly of substances capable of being extracted by supercritical fluid and forming a compact which contains the first dispersion medium, by casting the first slurry; turning second powder into a second slurry by dispersing the second powder in a second dispersion medium composed mainly of substances capable of being extracted by supercritical fluid, and forming a film layer by coating the surface of the compact with the second slurry; extracting and removing the substances contained in the compact and the substances contained in the film layer by means of the supercritical fluid; turning the film layer on the surface of the compact into an impermeable film layer to gas by heating the compact, from which the substances have been extracted and removed; and applying a hot isostatic pressing process to the compact, the film layer on the surface of the compact having been turned into the impermeable film layer.

21 Claims, 1 Drawing Sheet

METHOD FOR MANUFACTURING A SINTERED BODY WITH HIGH DENSITY

BACKGROUND OF THE INVENTION

1. Field of the Invention

The present invention relates to a method for manufacturing a sintered body with high density from powder.

2. Description of the Prior Arts

The method described below is generally known as a method for molding powder by casting.

Ceramic powders are dispersed in water to be turned into slurry. Deflocculating agent is added to the slurry and slurry properties are adjusted. The slurry with the adjusted properties is cast into a gypsum mold and solidified into a compact by letting the gypsum mold absorb a part of water contained in the slurry. The compact is dried by air drying or by heat drying to be turned into compact which can be provided to a sintering process. In this method, a heat evaporation is used as means for removing dispersion medium in case the dispersion medium is water. The dispersion medium is removed by a thermal decomposition when the dispersion medium is paraffin. However, the removal of the dispersion medium by either heat evaporation method or thermal decomposition method is disadvantageous in that both methods require lots of time.

Apart from the above-mentioned methods, Mr. Nishio and others, the inventors in the present application, disclosed the following in a Japanese Patent Application No. 100433/85 (a Japanese Patent Application Laid Open (KOKAI) No. 261274/86): metal or ceramics powder are dispersed in various sorts of alcohol to be turned into slurry. The slurry is cast into a gypsum mold and solidified into a compact by letting the gypsum mold absorb a part of dispersion medium. The dispersion medium contained in the compact is extracted and removed by supercritical carbon dioxide. In this patent application, however, only the method for removing the dispersion medium contained in the compact is disclosed. In the meantime, a hot isostatic pressing process is known as a method for turning into a high density sintered body, the porous compacts obtained by various sorts of methods for molding powders such as mold casting, plastic forming, press forming or the like. In the hot isostatic pressing process, a compact is sintered and is pressed isostatically by gas under conditions: temperatures of approximately from 500 to 2,200° C and pressures of approximately from 100 to 3,000 kg/cm²G. At the time of sintering under these conditions, it is necessary that a pore sealing process is applied in advance to the compact so that a gas pressure can spread over the surface of the compact without letting the gas enter into the pores of the compact. The methods described in a Japanese Examined Patent Publication No. 35870/84 and in a West German Patent No. 3,403,917 are introduced as methods of the pore sealing process.

The following is disclosed in the Japanese Examined Patent Publication No. 35870/84: an inner porous layer comprising low melting glass, low melting glass forming substance or high melting metallic substance is formed on the surface of a compact of silicon nitride, and the inner porous layer can turn into an impermeable film layer to high pressure gas at 1,300 to 1,600° C. i.e. at a temperature or less of sintering the silicon nitride. An outer porous layer, which can turn into an impermeable film layer comprising a low melting glass or low melting glass forming substance is formed on the surface of the inner porous layer, and the outer porous layer can turn into an impermeable film layer to the high pressure gas at a temperature or less at which the inner porous layer so does. Subsequently, after a degassing treatment is applied to the porous compact covered with the inner porous layer and the outer porous layer, a heat treatment comprising a first and a second heat treatment will be applied to the compact. The first heat treatment is carried out at a temperature which is necessary for the formation of the impermeable film layer from the outer porous layer, but enables the inner porous layer to maintain its porosity. Successively, the second heat treatment is carried out until a temperature is raised upto the temperature necessary for the formation of the impermeable film layer from the inner porous layer. After the heat treatment, a hot isostatic pressing process is applied to the porous compact at a temperature of from 1,700° to 1,800° C. and at a pressure of from 2,000 to 3,000 atm. In this method, however, to form the porous layer on the surface of the porous compact, slurry is made by dispersing powders in water, the porous compact is immersed in the slurry and thereafter, dried. This drying operation, which takes lots of time, needs to be repeated twice so as to form two layers of the inner and outer porous portions.

A density increasing method comprising the following steps is disclosed in the West German Patent No. 3,403,917 as a method for molding an intricate shape compact porous ceramics:

(a) A porous ceramic compact preliminarily formed is immersed in a suspension to form a first capsular layer on the surface of the porous compact, the suspension being prepared by dispersing a substance containing no sintering auxiliary in a solvent;

(b) The solvent in the first capsular layer is evaporated;

(c) Furthermore, the compact covered with the first capsular layer is immersed in a suspension to form a second capsular layer on the surface of the first capsular layer, the suspension being prepared by dispersing a substance containing one or more sorts of auxiliaries in a solvent;

(d) The solvent in the second capsular layer is evaporated;

(e) The compact, on the surface of which the first and the second capsular layers have been formed, is sintered in an atmosphere of protective gas;

(f) A hot isostatic pressing process is applied to the sintered compact; and (g) The first and the second capsular layers are removed mechanically.

Even in this method, however, an operation for evaporating and removing the solvent has to be repeated twice because the two porous layers are formed on the surface of the porous compact.

SUMMARY OF THE INVENTION

It is an object of the present invention to provide a method for manufacturing a sintered body with high density in a simple operation and in a short time.

To attain the above-mentioned object, the present invention provides a method for manufacturing a sintered body with high density comprising of the following:

First powder is dispersed in a first dispersion medium composed mainly of substances which can be extracted by a supercritical fluid to be turned into a first slurry. The first slurry is cast into a compact containing the dispersion medium;

Second powder is dispersed in a second dispersion medium composed mainly of substances which can be extracted by the supercritical fluid, to be turned into a second slurry. The second slurry is coated on the surface of the compact to form a film layer;

The substances of the first and the second dispersion medium, each, contained in the compact and the film layer are extracted and removed by the supercritical fluid;

The compact, from which the substances have been extracted and removed, is heated to make the film layer impermeable to gas on the surface of the compact; and A hot isostatic pressing process is applied to the compact with the film layer impermeable to gas on its surface.

The above object and other objects and advantages of the present invention will become apparent from the detailed description to follow, taken in connection with the appended drawings.

DESCRIPTION OF THE PREFERRED EMBODIMENT

Preparation of a compact

Figure 1:
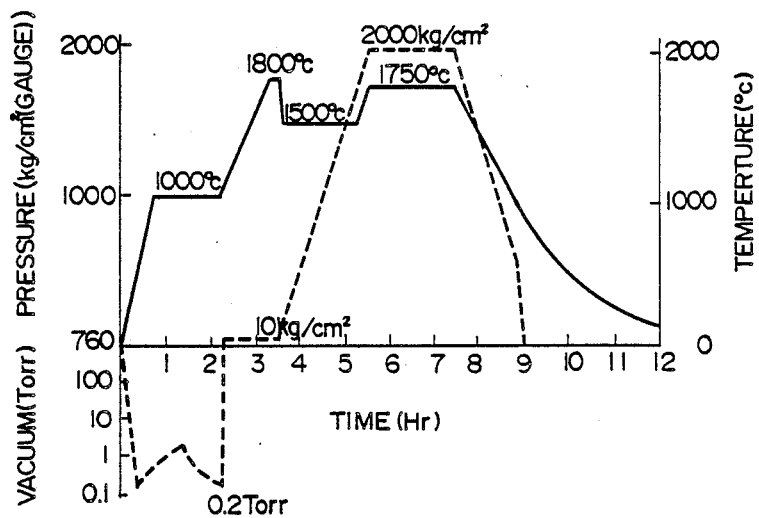
FIG. 1 is a graphic representation showing a heat pattern and a temperature rise pattern in the hot isostatic pressing process of Example 1 of the present invention.

First powder is dispersed in a dispersion medium composed mainly of substances which can be extracted by supercritical fluid, to be turned into a first slurry. The first slurry is cast into a mold to form itself into a compact containing the dispersion medium.

The first powder is metal powder, ceramics powder or composite powder of metal and ceramics. The metal powder can be 2% Ni and 98% Fe, SUS 316 or stellite powder. The ceramics powder can be alumina, silicon carbide, silicon nitride powder or zirconium powder. The composite powder can be tungsten carbide-cobalt or titanium nitride-nickel powder. The substances which can be extracted by supercritical fluid can be lower alcohol, acetone, stearic acid, cetyl alcohol, stearyl alcohol or paraffin. As the lower alcohol, methyl alcohol, ethyl alcohol, n-propyl alcohol, i-propyl alcoyhol, n-butyl alcohol, i-butyl alcohol or t-butyl alcohol is preferable.

The concentration of the first slurry ranges preferably from 40 to 75 vol. % powder. If the concentration is less than 40 vol. %, it is difficult that the compact is processed because the density of the compact decreases after the removal of the dispersion medium. If the concentration is over 75 vol. %, the fluidity of the slurry becomes worse and it is difficult that the slurry is packed into a mold. If a dispersion agent is added to the first slurry, the fluidity of the slurry increases.

In case the slurry is solidified by letting a mold absorb the dispersion medium, the mold made from gypsum or porous resin is used. In case the slurry is solidified by freezing the dispersion medium, the mold made from liquid non-absorbing materials is used.

Tool steel, hard rubber, aluminium, stainless steel or steel is selected appropriately and used as the liquid non-absorbing materials.

Formation of Film Layer

Second powders are dispersed in a dispersion medium composed mainly of substances which can be extracted by supercritical fluid, to be turned into a second slurry. The second slurry is coated on the surface of the compact to form a film layer. The second powders are any one selected from the group consisting of metal powder, ceramics powder and composite powder of metal-ceramics.

The concentration of the second slurry ranges preferably from 10 to 75 vol. % of powder. If the concentration is less than 10 vol. % of powder, the compact needs to be coated many times with the dispersion medium, which requires lots of work. If the concentration is more than 75 vol. % of powders, the fluidity of the slurry becomes worse and it is difficult that a homogeneous film layer is formed.

If the dispersion agent is added to the second slurry as to the first slurry, the fluidity of the slurry increases.

A single film layer is sufficient if the film layer can be removed easily from a sintered body after the hot isostatic pressing process which will be explained later. In case the film layer is not removed easily or in case the film layer reacts with the sintered body to change in quality, two film layers are preferable used. The two film layers are preferred to be composed of an inner film layer made from an inactive material difficult to sinter and a gas-impermeable outer film layer made from a material easy to sinter. The two film layer can be composed of two layers of films with different degrees of sintering to let them turn easily into ones impermeable to gas. Furthermore, a film layer made from an inactive material can be put between the compact and the two film layers to form three layers of film.

The inactive material hard to sinter is preferably formed from any one selected from the group consisting of high melting metal powder and non-oxide ceramics powder. As the high melting metal powder, tungsten, tantalum or niobium is preferably used. As the nonoxide ceramcis powder, boron nitride, aluminium nitride, silicon nitride, silicon carbide, titanium diboride, zirconium diboride or boron carbide is preferably used.

Extraction and Removal

Substances of the first and the second dispersion medium contained in the compact and the film layers are extracted and removed by a supercritical fluid. The materials used for the supercritical fluid, the critical temperatures of which are close to ordinary temperatures, are preferable, because those materials are treated easily. Those materials can be carbon dioxide, ethane, methylene, or monochlorotrifluoromethane. By the application of this supercritical fluid, the extractions of the substances from each of the dispersion mediums contained in the cast compact and in the film layers, which have conventionally been removed separately and individually, can be removed in one process. Therefore, the process can be simplified. Furthermore, the dispersion medium in the film layers has conventionally been removed by a heat evaporation. In this case, there have been problems in that cracks in the film layers are caused by contraction of the film layers. However, the use of the method of the extraction and the removal of the dispersion mediums by means of the supercritical fluid enables the film layers not to crack and to be obtained without defects. The following extracting conditions are preferred, when the supercritical fluid is, for example, carbon dioxide:

Pressure is from 80 to 200 kg/cm; and
Temperature is from 35° to 70° C.

Formation of Impermeable Film Layer

The compact, from which the extractable substances have been extracted and removed, is heated and the film layer on the surface of the compact is turned into an impermeable film layer to gas. The formation of the impermeable film layer is carried out at atmospheric pressure or in a vacuum. However, in case the problem of a thermal decomposition of the compact occurs such as silicon nitride, the compact can be compressed in an atmosphere of nitrogen. The atmosphere is selected, depending on the materials of the compact. When metal is used for the compact, an innert gas such as argon or nitrogen is used. Hydrogen can be added to the innert gas. When non-oxide ceramics is used, an innert gas atmosphere is preferred. When oxide ceramics is used, either the atmosphere of innert gas or the atmosphere of air can be selected. Before the turn of the film layer into the impermeable one, residual remaining in the dispersion medium, which cannot be extracted and removed, can be removed by heating or the residual can be removed on the way to the turn of the film layer into the impermeable one. The impermeable film layers have to plastically be deformed, without losing the gas impermeability, in compliance with the contraction of the compact during the hot isostatic pressing process.

Hot Isostatic Pressing Process

The hot isostatic pressing process is applied to the compact, the film layer on the surface of which has been turned into the impermeable film layer to gas.

EXAMPLE 1

A gypsum mold having cavity of 12mm $\phi \times$ 20mm was prepared. Slurry consisting of 88 wt.% of material powder made from 95 wt. % of $Si_3N_4$ and 5 wt. % of $Y_2O_3$, 11 wt. % of i-propyl alcohol and 1 wt. % of polyethylene glycol was cast into a mold. The cast slurry was left, for eight hours, as it was to have the dispersion medium in the slurry absorbed by the mold and a solidified compact of a cylindrical shape was taken out of the mold. After the compact was immersed in the slurry consisting of 35 wt. % boron nitride and 65 wt. % i-propyl alcohol, the compact was taken out to be exposed to the air for 10 minutes. Thereafter, the compact was immersed again in the slurry and taken out to be exposed in the air for 10 minutes. Such treatment was repeated five times in all.

Subsequently, the compact was immersed in the slurry obtained by mixing 35 wt. % of mixed powders consisting of 84 wt. % of $Si_3N_4$, 12 wt. % of $Y_2O_3$ and 4 wt. % of $Al_2O_3$ with 65 wt. % of i-propyl alcohol. After that, the compact was taken out and exposed to the air for 10 minutes. The compact was immersed again in the slurry. Such treatment was repeated five times in all. As a result, two film layers were formed.

Subsequently, the dispersion medium in the compact, on the surface of which the two film layers were formed, was extracted by carbon dioxide at a gauge pressure of 200 kg/cm$^2$ and at a temperature of 35° C. for one hour and a half. As a result, it was ascertained that the compact and the film layers, from which the dispersion mediums had been extracted and removed, had a weight almost corresponding to the weight of the starting material powder.

The compact, from which the dispersion medium had been extracted and removed, was set in a hot isostatic pressing apparatus. According to the heat pattern and the temperature-rise pattern as shown in FIG. 1, a vacuum degassing, a turn of the porous film into the impermeable film layers to gas and the isostatic pressing process were applied to the compact. That is to say, the vacuum degassing operation was carried out at 1000° C. and at a pressure of 0.2 Torr. The porous film layer was turned into the impermeable film layer, being maintained in an atmosphere of nitrogen at 1800° C. and at a gauge pressure of 10 kg/cm$^2$ for 10 minutes. The hot isostatic pressing process was applied to the compact, being maintained in an atmosphere or nitrogen at 1750° C. and at a gauge pressure of 2000 kg/cm$^2$ for two hours. After cooling the compact, the film layers on the surface of the compact were removed by sandblasting. The compact thus obtained had a high density corresponding to a theoretical density of 99.2%.

EXAMPLE 2

Material powder of from 5 to 60 $\mu$m in size consisting of 95 wt. % of W, 3.5 wt. % of Ni and 1.5 wt. % of Fe was prepared. Slurry was prepared by adding 8 wt.% of paraffin with a melting point of from 42° to 44° C. and 0.2 wt. % of oleic acid to 91.8 wt. % of the material powder and by stirring and mixing paraffin, oleic acid and the material powder at 80° C. for three hours. In the meantime, a mold provided with a water-cooled aluminium tube which had a rectangular cavity of 10mm $\times$ 50mm $\times$ 70mm was set. A compact was prepared by casting slurry being pressed at a gauge pressure of 3 kg/cm$^2$ into the water-cooled mold. The compact was coated with slurry consisting of 80 wt. % glass powder, which consists of 96.5 wt.% of $SiO_2$, 2.9 wt. % of $B_2O_3$ and 0.6 wt. % of $Al_2O_3$, 19.5 wt. % t-butyl alcohol and 0.5 wt. % carboxylic acid dispersion agent. Thickness of coated film was 0.5mm.

Figure 2:
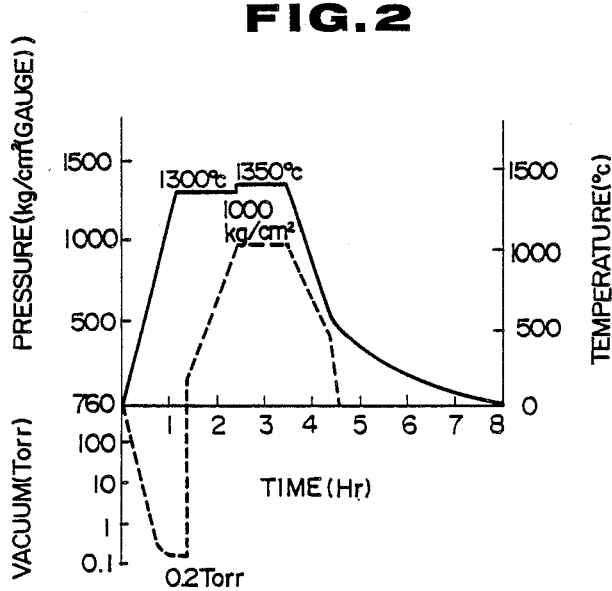
FIG. 2 is a graphic representation showing a heat pattern and a temperature-rise pattern in a hot isostatic pressing process of Example 2 of the present invention.

Subsequently, the dispersion medium in the compact was extracted by carbon dioxide at a gauge pressure of 100 kg/cm$^2$ and at 35° C. for two hours and it was ascertained that the compact and the film layer, from which the dispersion medium had been extracted and removed, had a weight almost corresponding to the weight of the starting material powder. The compact, from which the dispersion medium had been extracted and removed, was maintained at 800° C. and at a pressure of $10^{-3}$ Torr for two hours. After that, the compact was maintained at 1,300° C. and at a pressure of $10^{-3}$ Torr for 10 minutes and cooled at ordinary temperatures. The surface of the compact was covered with glassy materials. The compact covered with the glassy materials was set in the hot isostatic pressing apparatus. According to the heat pattern and the temperature-rise pattern as shown in FIG. 2, the glassy film layer of the compact was melted in an atmosphere of argon and the hot isostatic pressing process was applied to the compact. Namely, the glassy materials were melted, being maintained at 1,300° C. and at a pressure of 0.5 Torr for 10 minutes. The hot isostatic pressing process was applied to the compact, being maintained in an atmosphere of argon at 1350° C. and at a gauge pressure of 1000 kg/cm$^2$ for one hour. After cooling, the film layer was removed by sandblasting. The sintered body thus obtained had a high density of 99.6% corresponding to the theoretical density.

What is claimed is:

1. A method for manufacturing a high density sintered body comprising:

dispersing a first powder in a first dispersion medium comprising substances capable of being extracted by a supercritical fluid to form a first slurry, and casting said first slurry to form a compact containing said first dispersion medium;

dispersing a second powder in a second dispersion medium comprising substances capable of being extracted by a supercritical fluid to form a second slurry, and coating the surface of said compact with said second slurry to form a film layer of said second slurry thereon;

extracting and removing said substances contained in the compact and said substances contained in the film layer with a supercritical fluid;

heating the fluid coated compact from which the substances have been extracted and removed to render said film layer on said compact gas impermeable; and applying hot isostatic pressing to said compact having said gas impermeable film layer on the surface thereof to form a said high density sintered body.

2. The method of claim 1, wherein said first powder comprises metal powder, ceramic powder or composite powder of metal and ceramic.

3. The method of claim 1, wherein said second powder comprises metal powder, ceramic powder or composite powder of metal and ceramic.

4. The method of claim 1, wherein said supercritical fluid is carbon dioxide, ethane, ethylene or monochlorotrifluoromethane.

5. The method of claim 1, wherein said substances capable of being extracted by said supercritical fluid is a lower alkyl alcohol, acetone, stearyl alcohol, cetyl alcohol or paraffin.

6. The method of claim 1, wherein said substances capable of being extracted by said supercritical fluid is methyl alcohol, ethyl alcohol, n-propyl alcohol, i-propyl alcohol, n-butyl alcohol, i-butyl alcohol or t-butyl alcohol.

7. The method of claim 1, wherein said first slurry comprises a slurry of from 40 to 75 vol. % of said first powder.

8. The method of claim 1, wherein said second slurry comprises a slurry of from 10 to 75 vol. % of said second powder.

9. The method of claim 1, wherein said film layer comprises at least two film layers.

10. The method of claim 9, wherein the at least two film layers include two layers consisting essentially of an inner film layer made from an inactive material difficult to sinter and of an outer gas-impermeable film layer made from a material easy to sinter.

11. The method of claim 10, wherein the inactive material comprises high melting metal powder or non-oxide ceramic powder.

12. The method of claim 13, wherein less than all of said substances have been extracted and removed from said compact and residual substances still contained in said compact are removed by heating.

13. The method of claim 1, wherein each of said first and said second powders are selected from metal powders, ceramic powders and composite powders of metal and ceramic; said first slurry comprises a slurry from 40 to 75 vol. % of said first powder and said second slurry comprises a slurry of from 10 to 75 vol. % of said second powder.

14. The method of claim 13, wherein said supercritical fluid is carbon dioxide, ethane, ethylene or monochlorotrifluoromethane; and wherein said substances capable of being extracted by said supercritical fluid is a lower alkyl alcohol, acetone, stearyl alcohol, cetyl alcohol or paraffin.

15. The method of claim 14, wherein said film layer includes two layers consisting essentially of an inner film layer made from an inactive material which is difficult to sinter and of an outer gas-impermeable film layer made from a material easy to sinter; and wherein said inactive material comprises a high melting metal powder or a non-oxide ceramic powder.

16. The method of claim 15, wherein the inactive material is selected from the group consisting of tungsten, tantalum, niobium, boron nitride, aluminum nitride, silicon nitride, silicon carbide, silicon diboride, zirconium diboride and boron carbide.

17. The method of claim 16, wherein said substances capable of being extracted by said supercritical fluid is methyl alcohol, ethyl alcohol, n-propyl alcohol, i-propyl alcohol, n-butyl alcohol i-butyl alcohol or t-butyl alcohol.

18. The method of claim 14, wherein said substances capable of being extracted by said supercritical fluid is methyl alcohol, ethyl alcohol, n-propyl alcohol, i-propyl alcohol, n-butyl alcohol or t-butyl alcohol.

19. The method of claim 13, wherein said first dispersion is a slurry of paraffin and oleic acid containing metal powder comprising a major portion of tungsten and a minor portion of nickel and iron; said second slurry is a dispersion of t-butyl alcohol and carboxylic acid dispersion agent dispersing a silica glass powder containing boron oxide and alumina; and said supercritical fluid is carbon dioxide.

20. The method of claim 13, wherein said first dispersion is a slurry containing a major portion of i-propyl alcohol and a minor portion of polyethylene glycol; said second dispersion comprises a major portion of $Si_3N_4$ and minor portions of $Y_2O_3$ and $Al_2O_3$ in i-propyl alcohol; and said supercritical fluid is carbon dioxide.

21. The method of claim 14, wherein said powders are selected from the group consisting of metal powders having high melting points, alumina, silicon carbide, silicon nitride, tungsten carbide and titanium nitride.

* * * * *